May 24, 1932.  C. H. DESAUTELS  1,859,330
GUM STRIP APPLIER FOR TIRE BUILDING MACHINES
Filed Feb. 21, 1930

INVENTOR.
Charles H. Desautels.
BY
ATTORNEY.

Patented May 24, 1932

1,859,330

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

GUM STRIP APPLIER FOR TIRE BUILDING MACHINES

Application filed February 21, 1930. Serial No. 430,374.

My invention relates to tire building machines and more particularly to a device for applying a thin gum strip to a tire carcass formed on the building drum or core of a tire building machine.

In the manufacture of pneumatic tire casings one of the methods of locking the carcass plies to the bead is to fold the plies back over the bead, and it is customary to apply a thin strip of gum stock over the folded edge of the plies. Heretofore this gum strip has been stored in books or supply rolls and when used a piece of the approximate length was torn off and then applied to the carcass by hand. This method has several disadvantages; namely, the books or supply rolls are cumbersome and require considerable floor space, there is a wastage of stock due to inaccuracy of the operator to correctly approximate the needed length, and also it is difficult, if not impossible, for the operator to apply the strip to the carcass with a uniform lack of tension.

It is among the objects of my invention to provide a device which will apply the gum strip to the carcass rapidly and accurately and without any stretching and which will also act as a means of storing the gum strip when not in use. A further object is to provide such a device which will utilize the rotation of the building drum or core as a source of power to unwind the gum strip and unwind and wind the liner in which the gum strip is stored. Still further objects will be apparent from the following specification and claims.

Referring to the drawings.

Figure 1:
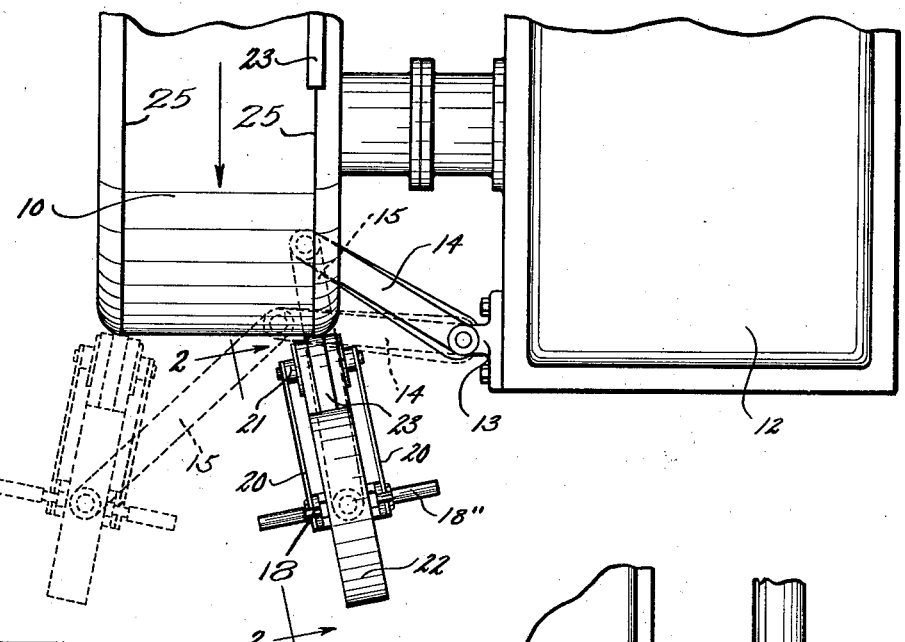
Fig. 1 is a plan view of a tire building machine with a semi-flat building drum showing my gum strip applying device in operation.

In the drawings 10 indicates a partially built tire carcass on a semi-flat building drum 11 adapted to be rotated in the direction of the arrow in Fig. 1 by a suitable driving means inclosed in housing 12. Pivotally secured to the housing 12 by bracket 13 and links 14 and 15 is a rotatably mounted forked frame 16, the forked portions of which are slotted to form guideways 17 for bobbins 18 and 19, bobbin 18 being formed with handles 18″ as best shown in Fig. 1. Secured to the forked frame 16 by straps 20 is a freely rotatable roll 21.

Figure 2:
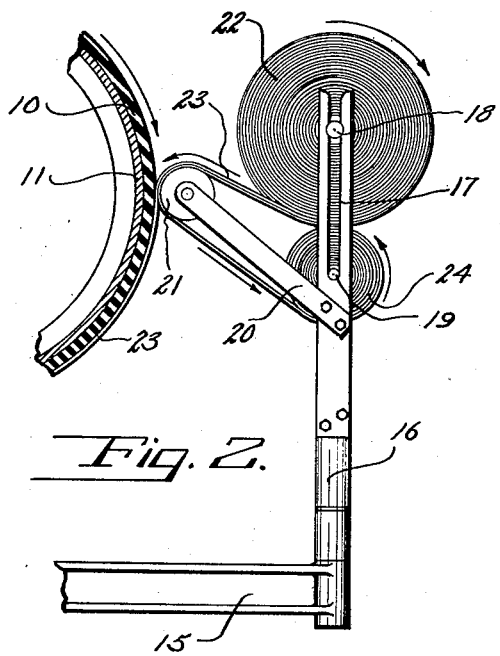
Fig. 2 is a view taken on line 2—2 of Fig. 1.

The operation of the machine is as follows. A roll of liner 22 in which is wound a gum strip 23 is slipped on bobbin 18. The end of the liner is then passed over the roll 21 and caught on bobbin 19 to form a roll of empty liner 24. As best shown in Fig. 2 the loaded liner roll 22 rests on the empty liner roll 24 and as indicated by the arrows when the operator engages the roll 21 against the revolving tire carcass 10, through the medium of handles 18′, the liner will be drawn from the roll 22 to the roll 24 due to the frictional drive of the rolls. The gum strip is started back in the roll 22 so that the roll 24 may reach a workable diameter but when the gum strip comes into contact with the carcass it adheres to the latter and is carried around on its circumference. It will be evident that by merely pressing the roll 21 against the tire carcass 10 at any desired point, such as the folded back edges 25, the gum strip will be applied in one revolution of the drum uniformly and without waste.

Figure 3:
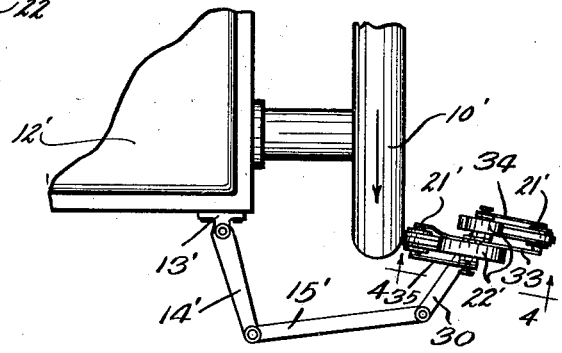
Fig. 3 is a plan view of a tire building machine with a building core and a modification of my gum strip applying device.
Figure 4:
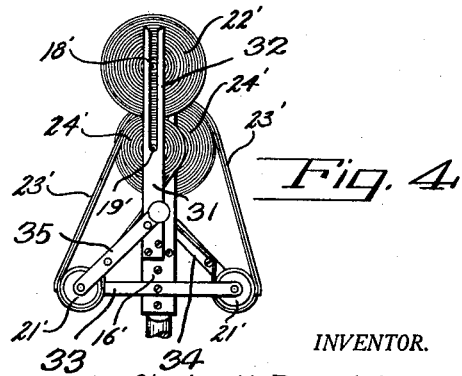
Fig. 4 is a view taken on line 4—4 of Fig. 3.

In Figs. 3 and 4 I have shown a modification of my gum strip applier comprising a double arrangement of rolls to accommodate gum strips of different cross-sectional dimensions. In Fig. 3 my invention is shown as applied to a core type building machine. All character numbers appearing in Figs. 3 and 4 are primed to correspond to the similar parts shown in Figs. 1 and 2 and although the arrangement is slightly altered the action and operation is substantially the same. Referring to Figs. 3 and 4, the forked frame 16′ is pivotally mounted in an arm 30 connected by links 14′ and 15′ to a bracket 13′ secured to the housing 12′ of the machine. A second forked frame 31 is secured in offset relation to fork 16′, a second set of rolls 22′ and 24′ being mounted in the guideway 32 formed by the forks of frame 31. Applying rolls 21' are mounted on the ends of a crosspiece 33 secured to the forked frame 16', the rolls 21' being positioned on opposite sides of the cross-piece 31 to align them with their associated rolls 22'—24' as shown in Fig. 3. Straps 34 and 35 brace the ends of cross-piece 33 to forked frames 16' and 31 respectively. As will be clear from Fig. 3, forked frame 16' may be rotated in the arm 30 to bring either of the applying rolls 21' into contact with the revolving tire carcass to draw the liner and gum strip from the associated roll 22', apply the gump strip to the carcass and wind the empty liner onto roll 24' as previously described.

Having thus described my invention, I claim:

1. A device of the character described comprising vertical supports formed to freely receive a pair of spindles one above the other, a freely rotatable roll offset from said supports and adapted to guide a liner web from the upper spindle to the lower and means to press the said roll against a tire carcass on a rotatable tire building former to transfer a gum strip, carried by the liner, to the tire carcass as the liner passes over said roll.

2. A device for applying gum strips to a tire carcass while supported on a rotating building former, which comprises a vertical frame provided with slotted guideways adapted to receive and rotatably support a liner let-off and a liner take-up roll in superposed contacting relation, a bracket secured to the frame, a freely rotatable applying roll, mounted in the free end of said bracket and positioned in the plane of said liner rolls but offset therefrom, about which the liner is looped in its passage from the let-off to the take-up roll, and a support for said frame formed of a plurality of links pivoted together and to said frame, whereby the applying roll may be pressed in desired position against the rotating carcass to deliver a gum strip from the liner directly to the carcass as the liner passes over the applying roll.

CHARLES H. DESAUTELS.